(12) United States Patent
Cowan et al.

(10) Patent No.: US 7,571,974 B2
(45) Date of Patent: Aug. 11, 2009

(54) CALIBRATION OF MULTI-DIE PRINTER

(75) Inventors: Philip B. Cowan, Vancouver, WA (US); Yifeng Wu, Vancouver, WA (US); David W. Kinkley, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 412 days.

(21) Appl. No.: 11/191,558

(22) Filed: Jul. 28, 2005

(65) Prior Publication Data

US 2007/0024647 A1 Feb. 1, 2007

(51) Int. Cl.
*B41J 29/393* (2006.01)
*B41J 29/38* (2006.01)

(52) U.S. Cl. .............................. 347/19; 347/5
(58) Field of Classification Search .............. 347/5, 347/19
See application file for complete search history.

(56) References Cited

U.S. PATENT DOCUMENTS

| | | | |
|---|---|---|---|
| 5,107,332 A | 4/1992 | Chan | |
| 5,508,826 A | 4/1996 | Lloyd et al. | |
| 6,042,211 A | 3/2000 | Hudson et al. | |
| 6,431,679 B1 | 8/2002 | Li et al. | |
| 6,693,726 B2 | 2/2004 | Childs et al. | |
| 6,851,785 B2 | 2/2005 | Wu et al. | |
| 2002/0126172 A1 | 9/2002 | Akiyama | |
| 2003/0058459 A1 | 3/2003 | Wu et al. | |
| 2004/0046820 A1* | 3/2004 | Wu et al. | 347/19 |
| 2005/0128248 A1* | 6/2005 | Wada et al. | 347/49 |

FOREIGN PATENT DOCUMENTS

JP 04028553 A * 1/1992 ................. 347/19

OTHER PUBLICATIONS

"Color Technology For Electronic Imaging Devices," Henry R. Kang, SPIE Optical Engineering Press, 1997, pp. 55-58.

* cited by examiner

*Primary Examiner*—Julian D Huffman
*Assistant Examiner*—Jason S Uhlenhake

(57) ABSTRACT

A multiple die printer may be calibrated by a method which includes receiving, for each die, optical density related measurements from a set of calibration targets printed on print media, each calibration target printed by nozzles of a single one of said multiple dies, the targets of each set of varying nominal optical densities, and creating linearization tables for each of said multiple dies.

18 Claims, 12 Drawing Sheets

Black Data Reference Lin Curve

Black Die Lin Tables

CALIBRATION OF MULTI-DIE PRINTER

BACKGROUND

Due to manufacturing variability the size of the drops in inkjet printers is variable within a manufacturing tolerance. Typically this tolerance may be on the order of 15% for thermal inkjet printheads. This variability in drop size directly affects the amount of ink that is delivered by the printhead. This variability may be called the drop weight variability of the printhead.

For consumer home printers usually no attempt has been made to calibrate the drop weight of a printhead, in part because for home printers a typical tri-color printhead outputs cyan/magenta/yellow. Thus if the drop weight for a printhead is heavier or lighter than the nominal printhead, the customer will not see a color hue shift because all three colors are equally effected. Also since this single printhead is scanned across the page the color content across the page will appear consistent. For a printing platform employing a page wide array of dies, this may not be true. For example, assume an array includes ten dies spatially arrange to provide a page wide configuration. An example is to print a solid patch of cyan across the page. Since ten separate dies are involved, each with its own drop weight characteristic, the apparent intensity of this cyan patch will vary across the page, as a function of the die drop weights, and the human eye may readily be able to discern the die boundaries.

BRIEF DESCRIPTION OF THE DRAWINGS

Features and advantages of the disclosure will readily be appreciated by persons skilled in the art from the following detailed description when read in conjunction with the drawing wherein.

DETAILED DESCRIPTION

Figure 1:
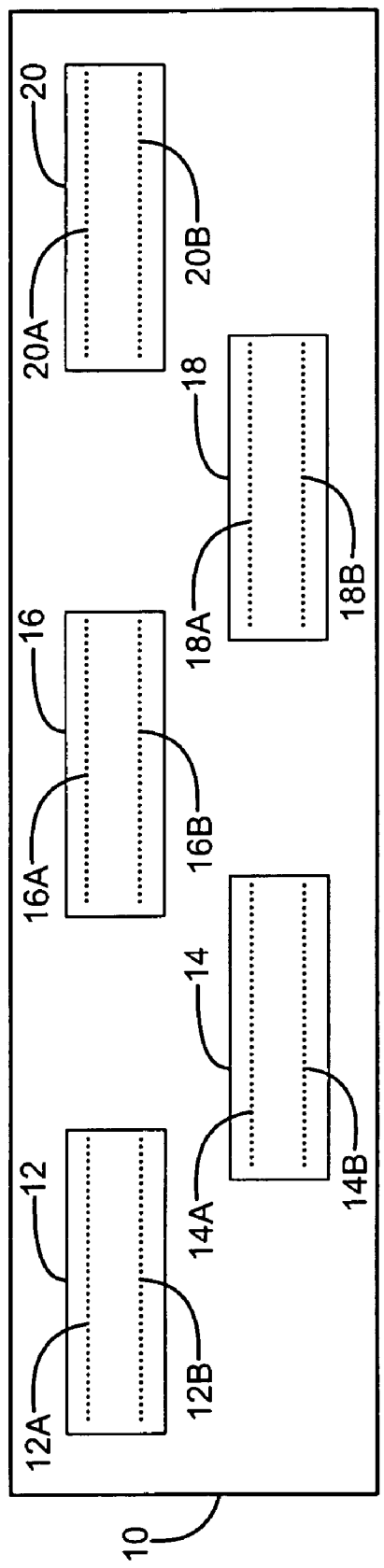
FIG. 1 schematically illustrates an exemplary embodiment of an inkjet printhead having a plurality of nozzle dies mounted thereon.

In the following detailed description and in the several figures of the drawing, like elements are identified with like reference numerals.

FIG. 1 schematically illustrates an exemplary embodiment of an inkjet printhead 10, having a plurality of nozzle dies 12, 14, 16, 18, 20 mounted thereon. Each die in this example has formed therein 1056 nozzles per column, with a spacing of 1200 nozzles per inch; each die is 0.88 inch long. Each die has 2 columns, thus allowing the printhead to output 2 colors if the respective columns are fluidically coupled to ink supplies of different colors. Each die (except for die 12, the first die, and die 20, the last die) has a 40 nozzle overlap with adjacent die on both sides. For example, nozzle columns 12A, 14A, 16A, 18A, 20A of respective dies 12, 14, 16, 18, 20 may be configured to output ink of a first color, and nozzle columns 12B, 14B, 16B, 18B, 20B may be configured to output ink of a second color.

Figure 2:
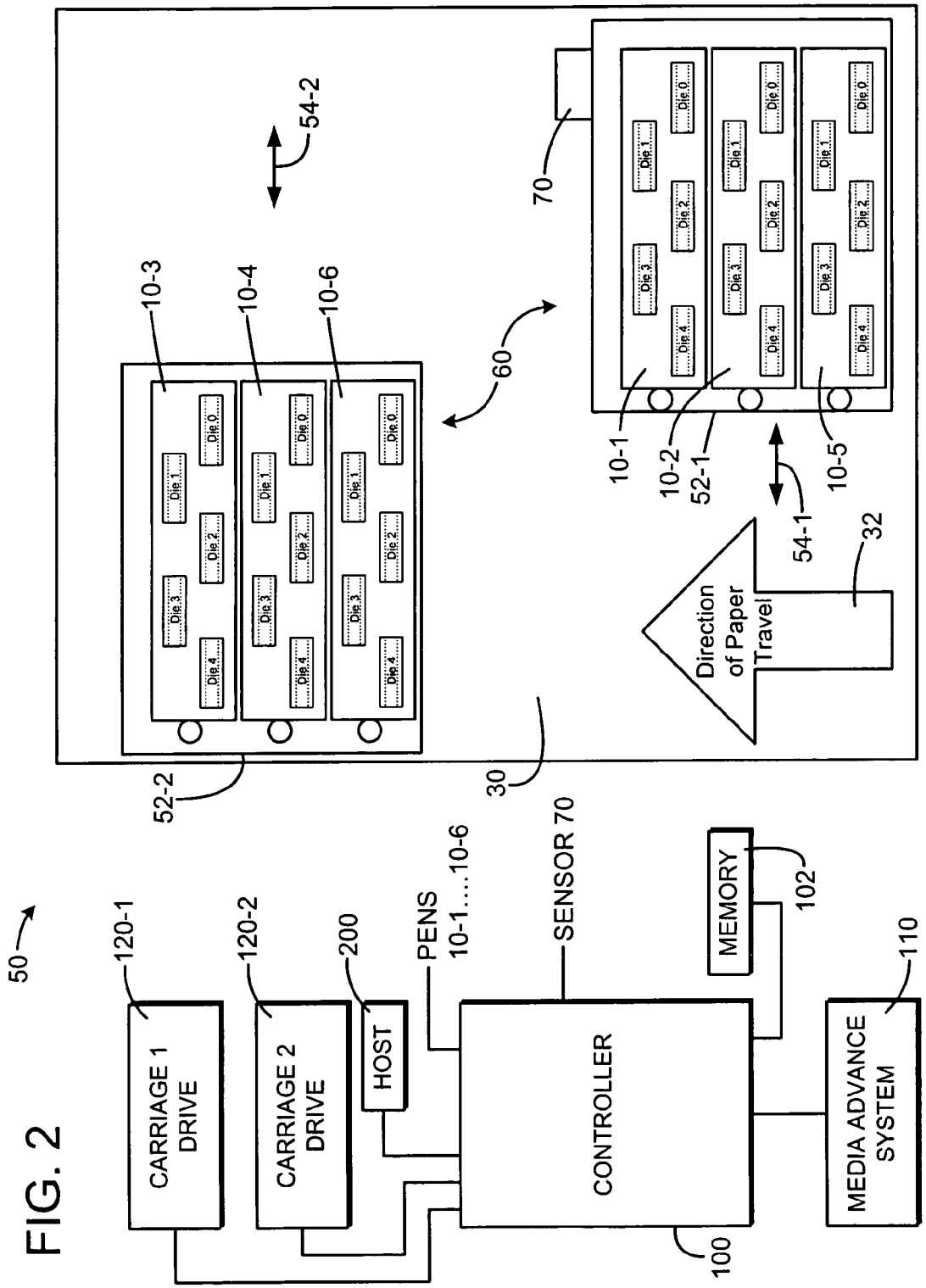
FIG. 2 schematically illustrates an exemplary embodiment of a printer system.

FIG. 2 schematically illustrates an exemplary embodiment of a printer system 50, which includes a page-wide array 60 of inkjet printheads 10-1 . . . 10-6. In this example, each printhead has five dies, as described above regarding printhead 10 of FIG. 1. In this embodiment, there are two sets of printheads each mounted in a scanning carriage. Thus, printheads 10-1, 10-2 and 10-3 are mounted in carriage 52-1, and printheads 10-4, 10-5 and 10-6 are mounted in carriage 52-2. Each carriage may be driven along its respective scan axis 54-1, 54-2 over a range of movement. This particular arrangement is of course merely one example of a page wide array. For other embodiments, more printheads or a single printhead may be employed.

The page-wide array 60 of FIG. 2 uses two printheads to output cyan and magenta dye, and two printheads to output yellow and black dye. In this embodiment, printheads 10-1 and 10-3 output cyan and magenta from respective corresponding columns of nozzles on dies 0 to 4 of these printheads, and printheads 10-2 and 10-4 output yellow and black dye from respective corresponding columns of nozzles on dies 0 to 4 of these printheads. Printheads 10-3 and 10-6 output two fixer fluids F1 and F2 from respective columns of nozzles of dies 0 to 4 of these printheads, and may be omitted for some applications.

In an exemplary embodiment, the printing system arranges the carriages 54-1 and 54-2 holding these printheads so that the writing system can print substantially across the width of an entire 8 ½ inch page without the printhead carriages moving; wider paper sizes may be accommodated by moving the carriages. This arrangement is depicted in FIG. 2. Full width coverage is provided by physical overlap of the printheads in the center part of the scan axis, so that no coverage gap exists in the center part of the page.

In this exemplary embodiment, the printing system 50 includes a controller 100 which may be responsive to a host 200 for receiving a print job, and a memory 102. The system includes a media advance system 110 for advancing the print media, e.g. sheet 30 past the printheads. The media advance system may include a drive roller or rotatable platen, an endless belt, or other arrangement. In one exemplary embodiment, the media advance system may include a rotatable drum which holds the print media against its outer surface during printing. The carriages 52-1 and 52-2 are independently scannable along their respective scan axes by respective carriage drives 120-1 and 120-2, under control of the controller 100. The controller also provides print commands to the printheads to control the firing of the individual nozzles.

The printing system of FIG. 2 includes respective an optical sensor 70 with a 4 color (red, green, blue, orange) LED light source and detector that is mounted on the printer carriage 52-1. The analog voltage values returned by the color sensor are converted to CIELAB L*a*b* color space for further processing. The sensor may capture images of print portions laid down by the printheads of the respective sets. In an exemplary embodiment, the sensor measures columns of image data, with the drum spinning to capture each column, and the carriage 52-1 is moved along the scan axes to capture successive data columns. An exemplary sensor suitable for use is the Vishay model K785P color LED sensor, although other sensors may alternatively be used. Alternatively, separate sensors may be employed on each carriage, but will add complexity in calibrating and cross-calibration.

The printer 50 also includes a controller 100, memory 102 and media advance system 110 for advancing print media 30 along a media advance path indicated as path 32. In this embodiment, the carriage 52 and the printheads are stationary during printing operations.

In an exemplary embodiment, a calibration method may be employed to calibrate the printheads of a printing system such as, for example, the printing system of FIG. 2. In an exemplary embodiment, a calibration method calibrates parameters based on a spectral attribute, and employs a color metric space known as L*a*b* (CIELAB). L* or luminosity is a measurement of optical density or lightness, with 0 being defined as pure black and 100 pure white. b* is a measurement along the yellow—blue color axis, with 0 being no yellow-blue component, negative b* is more blue, positive b* is more yellow. Negative a* is green; positive a* is red.

In the following description of an exemplary calibration method, there are two mode types, the printhead equalization mode, and the colorimetric mode. The printhead equalization mode is selected for the case in which the media type on which the calibration targets are printed is unknown. If the media type is known, i.e. characterized with characterization data for the media type available for retrieval by the printer, the calorimetric calibration mode is selected, and data stored in memory corresponding to the known media type may be employed in the calibration process. The printer interface may provide a means to select the calibration method, e.g. by a panel selection of the particular mode, or by an indication of the media type, which the printing system can then compare against known medias. The printer controller 100 may include firmware or software instructions stored in memory 102 to carry out the calibration method.

An exemplary calibration technique includes several steps. Color calibration target sheets are printed on print media for each printer primary color for each die. The calibration targets are optically scanned by the optical sensor, and optical density values are provided for each target, with targets of varying optical densities, to provide optical density tables for each color. If an unknown media is used for printing the target sheets, one of the sets of optical densities from one die is selected to be used as a reference table, and linearization tables are created to match the reference table. If a known media is used to print the color targets, linearization tables are created for each die and color to linearize the spectral output from a spectral goal value to the print media white value.

The method may include the further step of concatenating the generated linearization tables with any previously generated linearization tables. For example, there may be reference linearization tables for the color maps, and for each print mode, i.e. for each color for the printer, and it will typically be a linear function, to pre-linearize the system, to create a smooth color space. This color map reference table is an example of a pre-existing linearization table which may be concatenated with the linearization tables created during a calibration process. An exemplary algorithm for concatenating a generated linearization ("lin") table with a previously generated linearization table is set out in the following tables:

1. Data Structure Definition

| Lin Table Entry | |
|---|---|
| integer | tone; |
| integer | dither_value |
| integer | dither_bitDepth; (this value is fixed) |
| integer | firmware_tone; |
| float | dTone; |

Lin Table is an array of Lin_Table_Entries, each an 8 bit integer tone, values 0 to 255. Note that the dither_bitDepth is the number of bits of data to allocate to the dither value; this is normally 2 to 8 bits (max dither values of 3 (22−1) to 255 (28−1). For example, for one exemplary writing system platform, 4 bits is used for the dither term. Firmware_tone is tone value shifted left by dither_bitDepth+the dither_value. The tone is an 8 bit value and thus has values 0 . . . 255. The floating point representation of the tone/dither value is simply float(tone+dither/float(2**dither_bithDepth).

2. Input Lin Table Definitions

There are two input lin tables to the lin table concatenation algorithm. The first lin table is the reference or seed lin table, and the second lin table is the updated lin table.

3. Algorithm

For each input tone in the range (0 . . . 255), get the adjusted tone and dither values by indexing into the seed lin table and returning the Lin_Table_Entry;

```
tone1_prime1 = Seed_LinTable[input_tone].tone;
if (tone1_prime1 = 255) then
output_tone=255, output_dither=0;
else
tone1_prime2 = Seed_LinTable[input_tone].firmware_tone;
dither_percent = Seed_LinTable[input_tone].dither_value /
    (2 **dither_bitDepth);
delta_tone = Seed_LinTable[tone1_prime1+1].firmware_tone -
    Seed_LinTable[tone1_prime1].firmware_tone;
output_firmwareTone = tone1_prime2 + delta_tone *
dither_percent;
output_tone = output_firmwareTone / (2**dither_bitDepth);
(integer math)output_dither = output_firmwareTone -
    (output_tone <<
dither bithDepth);
```

4. Repeat above process for all 255 tone levels.

A set of linearization tables may be provided for each printer color (e.g., black, cyan, magenta, yellow) for each printmode. This may include averaging die contributors due to carriage movement in multi-pass printmodes. Thus, in an exemplary embodiment, even though the color calibration was executed on a single media, the results may be used to generate linearization table sets for all supported printmodes and print media.

Figure 3:
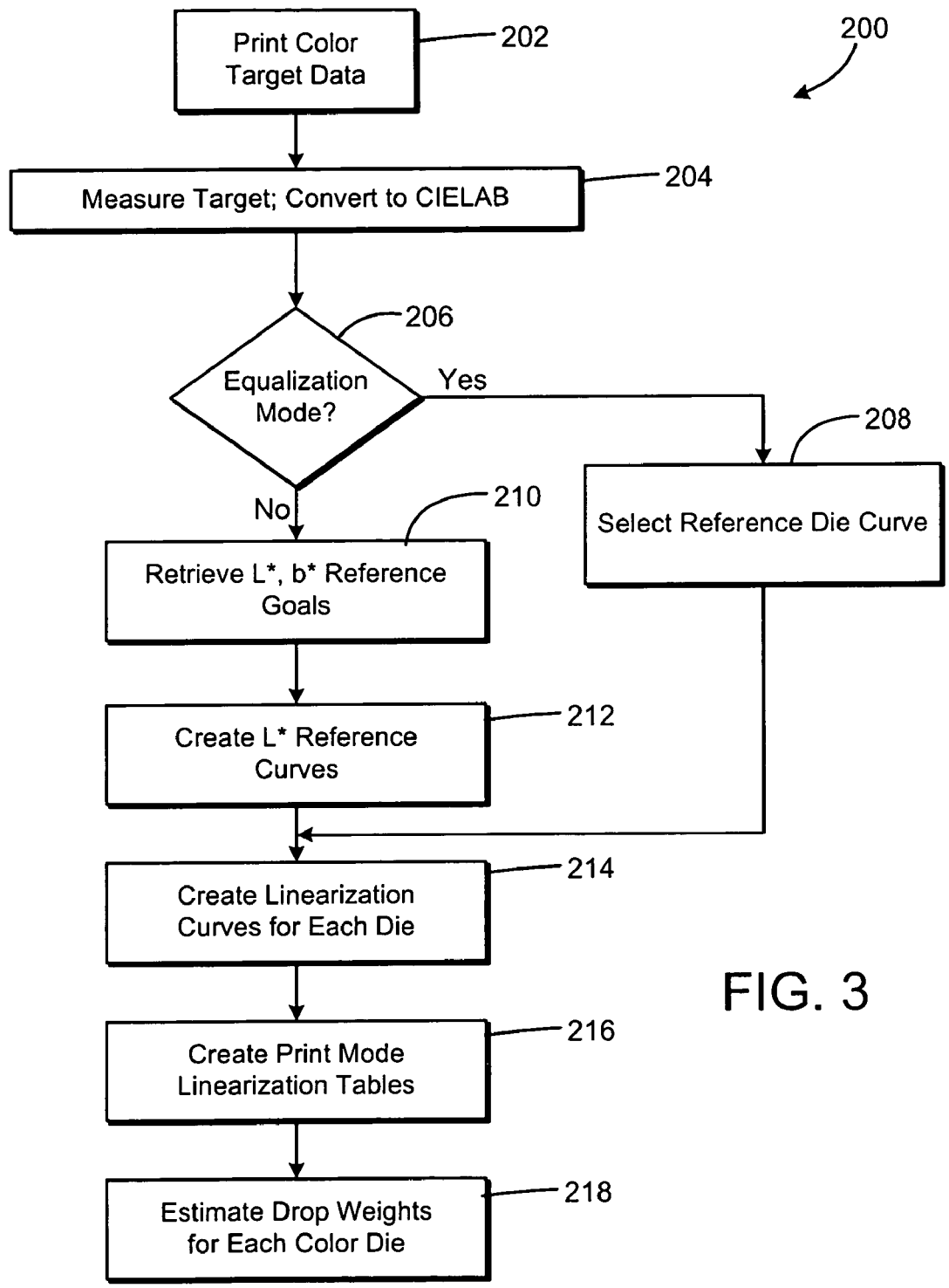
FIG. 3 is a flow diagram of an exemplary embodiment of a color calibration method.

In an exemplary embodiment, the calibration method includes the following steps, as depicted in FIG. 3.

Figure 3A:
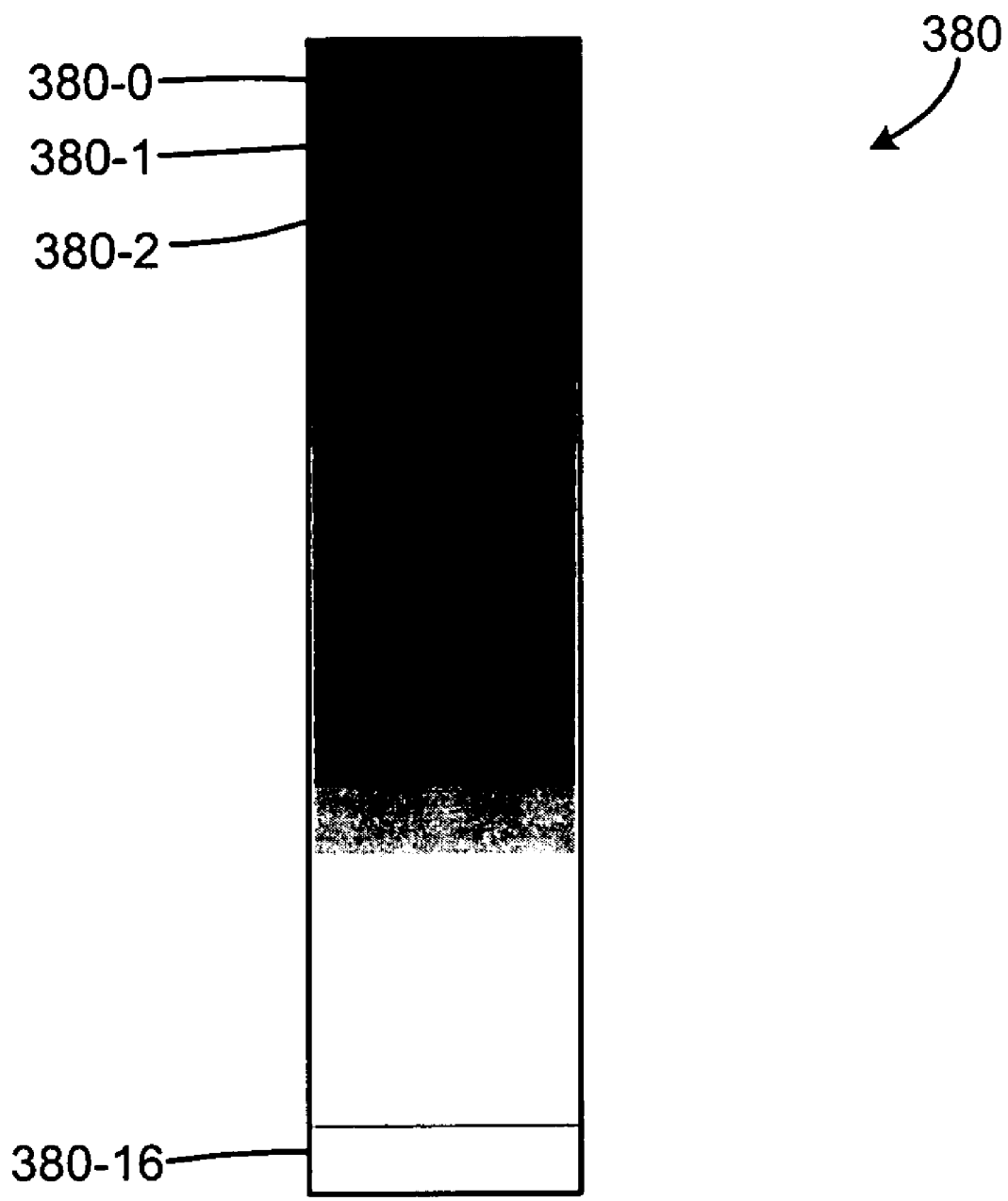
FIG. 3A illustrates an exemplary color target.

At step 202, print color target data, from digital count values, 0 (paper white) to 255 (full on color) in steps of 16. FIG. 3A illustrates an exemplary calibration target 380, with target patches 380-0, 380-1, 380-2, . . . 380-N (=16 in this case), with 380-16 corresponding to paper white optical density, and 380-0 corresponding to full on color. For each color in the printer embodiment of FIG. 2, there are 10 dies to sample (2 pens, 5 dies per pen). Each color target may be sampled twice to improve the signal to noise ratio of the color sensor. In an exemplary embodiment, 4 pages of color target data, one for each color, are printed in two separate operations. In the first operation the color target data is printed for cyan and magenta. For more accurate sensing, target data for each color may be printed on separate pages; for other embodiments, target data for more than one color, or for all colors, may be printed on one page.

At 204, the data printed in 202 is measured, and the data converted to L* (204; FIG. 3). In an exemplary embodiment, the sensor 70 has 4 LEDs, and the sensor outputs may be denoted as RGBO, representing respectively the output signals from Red, Green, Blue and Orange channels. In an exemplary embodiment, a second order polynomial function may be used to convert sensor RGBO to L* and b* Cielab data. The coefficients of the polynomial function are obtained by a sensor calibration step which is performed, for example, at the time of manufacturing the printer. During the sensor calibration, a test target containing a number of color patches is measured both by the sensor and by a spectrophotometer. These two measuring data are used as the training sets, and a Least-Mean-Square method is used to calculate the optimal curve fitting coefficients of the polynomial function. The following table provides an example of L* black data.

| Patch # | Tone Level | L* |
|---|---|---|
| 0 | 255 | 23.5398 |
| 1 | 240 | 27.6259 |
| 2 | 224 | 29.6717 |
| 3 | 208 | 31.9149 |
| 4 | 192 | 33.3456 |
| 5 | 176 | 35.642 |
| 6 | 160 | 38.9444 |
| 7 | 144 | 41.6453 |
| 8 | 128 | 44.8859 |
| 9 | 112 | 49.3193 |
| 10 | 96 | 53.5968 |
| 11 | 80 | 57.9008 |
| 12 | 64 | 63.4717 |
| 13 | 48 | 68.9595 |
| 14 | 32 | 75.8135 |
| 15 | 16 | 83.5352 |
| 16 | 0 | 93.4882 |

An n-order polynomial curve fitting may be applied to smooth the sampled data resulting from the measurement. Curve fitting techniques suitable for the purpose are known in the art; one exemplary technique is the polynomial regression technique described in "Color Technology for Electronic Imaging Devices," Henry R. Kang, SPIE Optical Engineering Press, 1997, pp. 55-58. The L* data is saved to non-volatile memory 102. This process is repeated for the black and yellow color data, although in case of yellow, b* data is measured.

If an unknown media is used to print the color calibration targets, the color calibration mode is defaulted to printhead equalization. If the calibration mode is the printhead equalization mode (206), operation proceeds to 208, to select a reference die curve from the set of measured die curves. The maximum drop weight die, middle drop weight die, minimum drop weight die, or an average of all the dies are examples of drop weight parameters which may be selected for equalization in a given application. In an exemplary embodiment, the drop weight parameter is selected by the manufacturer, and the calibration algorithm set up accordingly. In an exemplary embodiment, there is no attempt to linearize the data; the reference curve used will be the L* data that was measured for that die. Since not all 255 possible tones are measured, in an exemplary embodiment, the reference curve linearly interpolates between control points. This method of color calibration does not calibrate printers to each other, but will allow for calibration of the color output for a given printer on any media.

If a known print medium was used to print the color target data, at 206, the calibration mode is set to the calorimetric mode, and, reference L*, b* goals are retrieved at 210.

At 212 L* reference curves or tables are created for each color. Since a known media was used to print the color calibration targets, and the color calibration mode is set to calorimetric, a goal L* value is used for the maximum tone value (i.e. full on color), and the measured paper white L* is used for the white point value. In an exemplary embodiment, then, there are 16 printed color samples, plus one paper white sample for every die. A reference curve that is linear from the maximum tone (min L*) to the paper white L* is then generated. This method of color calibration may allow calibration of any number of printing platforms together for a consistent color output. Exemplary known media types which may be pre-characterized include, for example, HP Multipurpose Paper, HP Office Paper, HP Bright White Inkjet Paper, HP Premium Inkjet Paper. Other medias could be supported if they were characterized. Data stored for each "known media type" may include the maximum L* value, i.e. the paper white value.

Figure 3B:
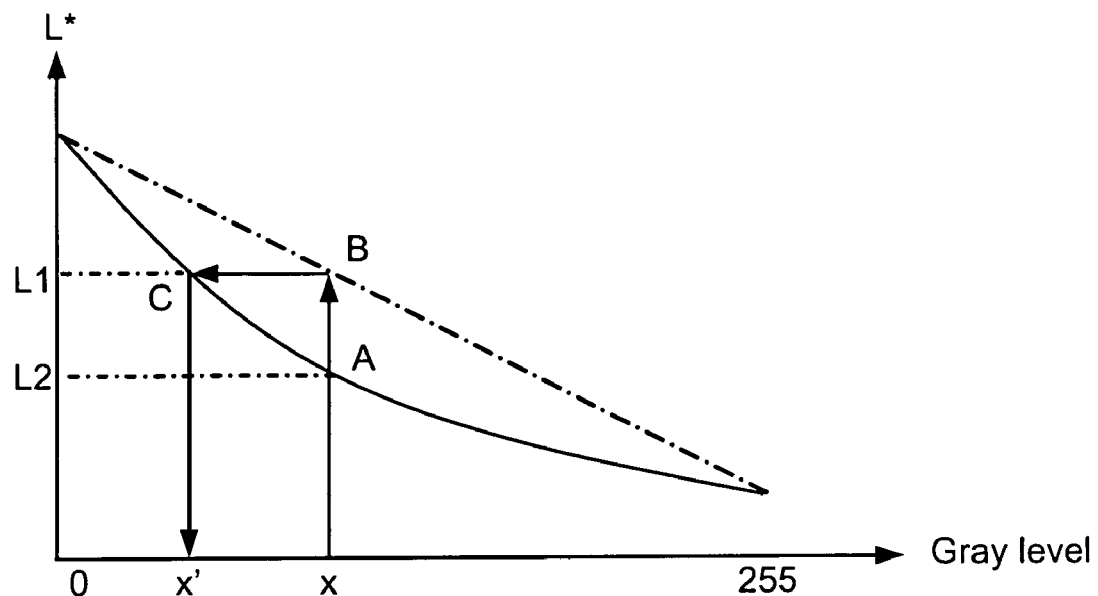
FIG. 3B depicts a solid line showing L* measurements for a given die, and a dotted line shows a reference curve.
Figure 3C:
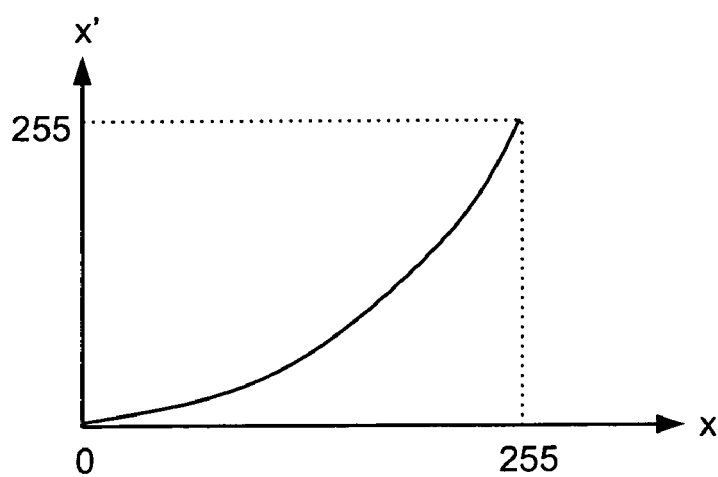
FIG. 3C shows an exemplary curve of a linearization function.

At 214, linearization curves or tables are created for each individual die, using the reference curves calculated or selected in step 208 or 212, depending on the mode, and the measured color data, so the output from each die will match the reference curve. An exemplary technique for creating the linearization curves from the reference curves is the following. FIG. 3B depicts a solid line showing L* measurements for a given die, and the dotted line shows the reference curve. For instance, if a color patch is printed with gray level x, it is expected to get a linear output L1, but in reality L2 is provided due to the non-linearity of dot gain. To correct this non-linearity, an input gray level is found with which L1 may obtain in the L* curve. At first, the intersection between x and the reference curve is searched for, and found in point B. Then the intersection between B and the L* measurement curve is searched for, and found at C. The corresponding gray level x' of the point C is the pre-deformed value for x. This example shows that if a function is used to pre-deform x to x', a linear relationship may be obtained between the input gray level and the output L*. The function that deforms x to x' is called a linearization function. And if a look-up table is used to describe this function, it is called a linearization table. FIG. 3C shows an exemplary curve of a linearization function. In this example, the reference curve (FIG. 3B) is a straight line. But in practice, any monotonic curve may be defined as the reference, and the output response calibrated to that curve.

Step 6. Create print mode linearization tables (216; FIG. 3). In actual printing using the exemplary printer platform illustrated in FIG. 2, the printheads may be moved depending on the number of passes, or rotation of the drum, that is used to print on selected media and print quality. The output linearization table set is a collection of the linearization tables required to print across the page. This data structure stores the number of linearization tables contained within this set, the locations relative to the print swath where the linearization tables are valid, and the individual linearization tables for the given print mode. In an exemplary embodiment, for each print mode, for a single color, the linearization tables of this print mode are concatenated with the ten die linearization tables created during the calibration mode as described above for drop weight equalization. Thus the final output linearization table set may contain as few as 10 linearization tables (for one print mode) to more than 100 linearization tables (for more than 10 print modes).

Step 7. Feedback to the writing system estimated printhead drop weights (220; FIG. 3). In an exemplary embodiment, the color calibration program may perform one additional function, and that is to estimate what the drop weights are for each of the color dies. This information may then be used by other functions within the printing platform to implement features such as determining paper dry time requirements. This is an optional step.

An exemplary technique for estimating the drop weights follows. Assumptions for this technique are that the data has been sampled using a known and characterized media, and the nominal drop weight of the reference printhead (or die) is known. The Halftone Table Data is a table that maps input tone value to drop count (maybe 1 or more drops of ink for printers that support multi-level printing). This table is merged with the input lin tables so that a mapping from input tone value (0 ... 255) through the lin table and the halftone table creates a mapping function from input tone value to actual drop count.

The reference L* curve is the reference L* curve that was used to create the output lin tables. The minimum L* value is the goal L* value for the selected media (darkest point, tone value 255) and the maximum L* value is the measured paper white point (tone value 0). The L* values for tone 1 to 254 are linearly interpolated from the goal L* value and the paper white L* value.

The actual L* Curve for the current die to estimate printhead drop weight is the measured L* values sampled from paper white (tone value 0) to the maximum L* value (tone value 255) in steps of 16. Intermediate tone L* values are linearly interpolated from the measured data.

The steps of the exemplary algorithm for estimating drop weights are the following:

Step 1. Create drop count table
For tone in range 0 to 255:
  Look up tone_prime, and dither value from the input lin_table
  if tone_prime=255 then drop_count=halftone_table[255].drop_count; else
    delta_dropcount=halftone_table[tone_prime+1].drop_count−halftone_table[tone_prime].drop_count;
    delta_percent=dither/(2**dither_bit_depth)
    delta_dropcount=delta_dropcount*delta_percent
    drop_count=halftone_table[tone_prime].drop_count+delta_dropcount;
  Repeat the above algorithm for both the reference L* fin table and the lin table for input die.

Step 2 Estimate required tone value to obtain reference L* value
  Obtain the reference curve L* value at a specified tone value. (For one exemplary application, this tone is specified as 128).
  Search the die L* table for the appropriated tone value required to match this reference L* value. This may require linear interpolation between 2 tone values to obtain this L* value, thus this tone value will be a floating point number in the range of 0.0 to 255.0

Step 3 Determine actual drop count to obtain reference L* value
  If (estimated_tone<255.0) then
    tone_low=int(estimated_tone)
    tone_high=tone_low+1
    delta_tone=estimated_tone−tone_low (this is a floating point>=0.0 and <1.0)
    drops=drop_count_table[tone_low]+(drop_count_table[tone_high]−drop_count_table(tone_low])*delta_tone Step 4 Estimate die drop weight
  Drop_weight_variance=drops/drops_reference
  printhead_Drop_Weight=Reference_Pen_Drop_Weight*(Drop_weight_variance)

Figure 4A:
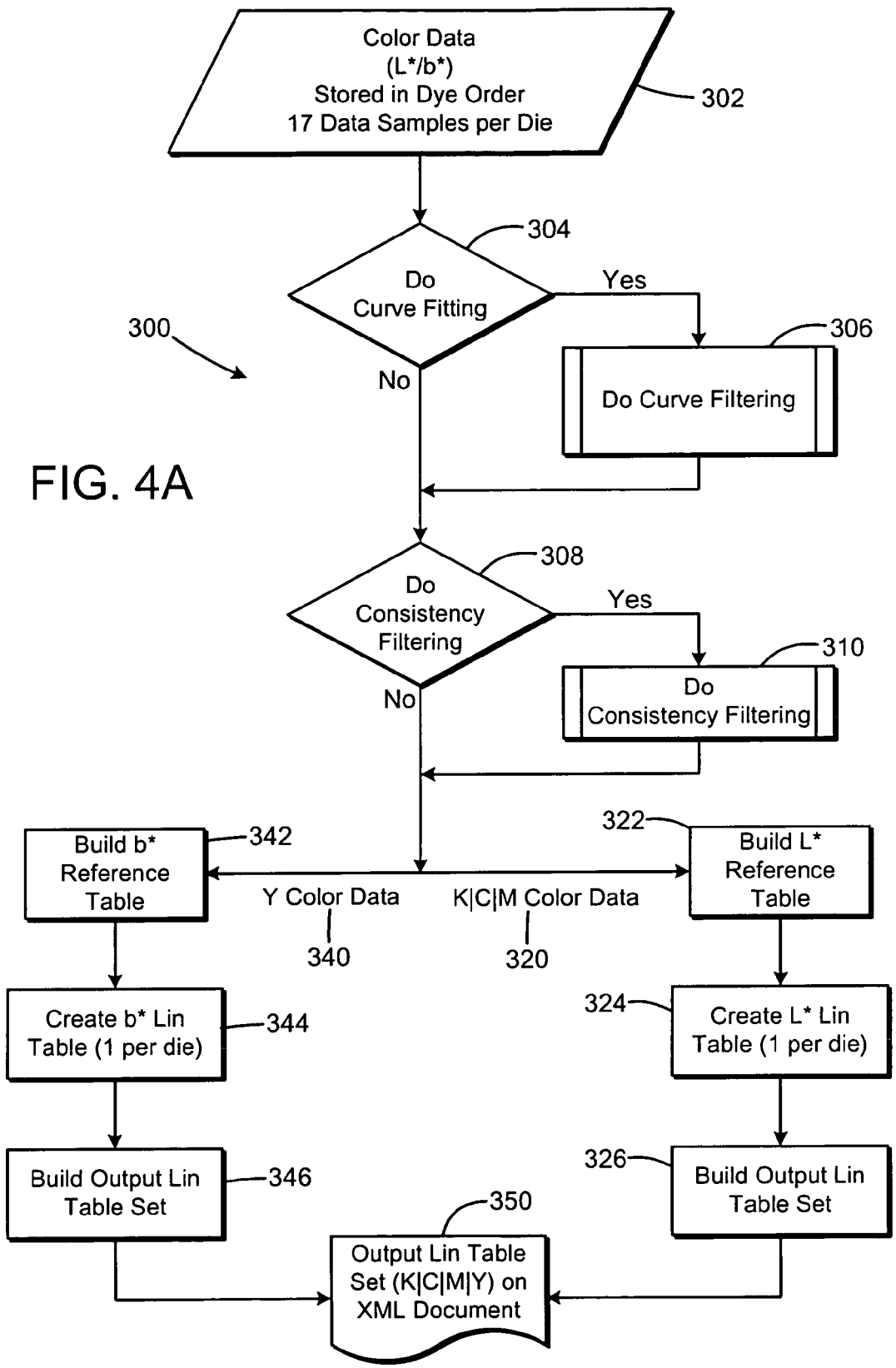
FIGS. 4A-4B illustrate a flow diagram of an exemplary embodiment of a color calibration method.
Figure 4B:
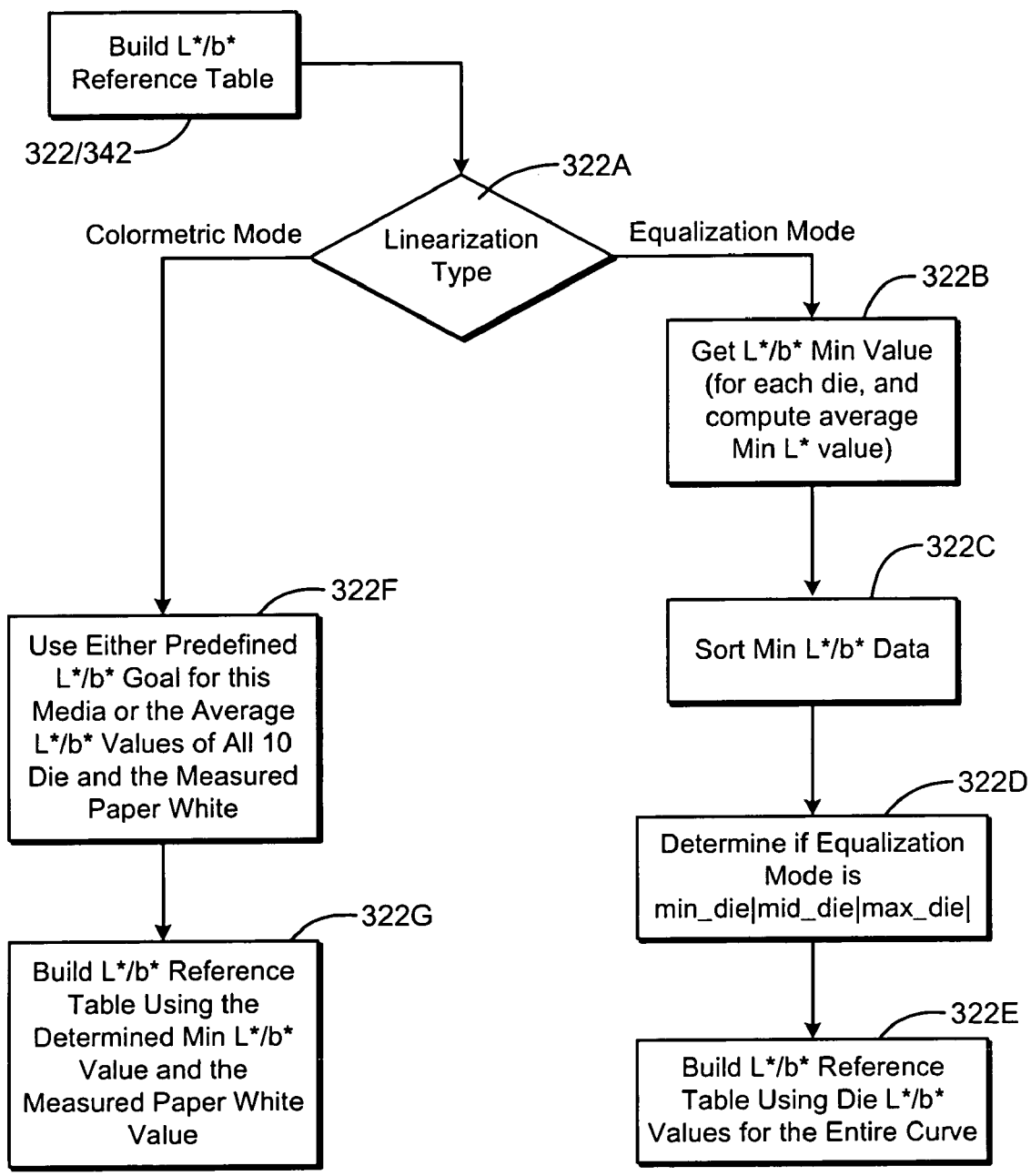

FIGS. 4A-4B illustrate another exemplary embodiment of a color calibration process. Color calibration is performed using a set 302 of color data in CieLab format (L*/b*) is stored in die order, with 17 data samples per die. The set of color data is the product of printing and optically scanning color targets printed by the printer to be calibrated. For example, this may be the product of steps 202 and 204 in FIG. 3, using measurements from targets such as the target 380 of FIG. 3A. A decision is taken at 304 as to whether to perform curve fitting/filtering on the data set 302. If yes, then at 306 curve fitting is performed, in this exemplary case using a $5^{th}$ order polynomial. If this assumption of a $5^{th}$ order polynomial is not correct, which might prevent a solution using the curve fitting algorithm, the decision at 304 may be negative, bypassing step 306.

Consistency filtering may also be performed (308, 310) on the color data set, This filtering step is optional, and if performed has a goal to provide average white values, and ensure that there is no crossing of data from a printhead having a heavy drop weight with a printhead having relatively lighter drop weight characteristics.

The data is then used to build output linearization table sets (350, FIG. 4A), with the L* K/C/M color data 320 passed to step 322, and the b* Y color data 340 passed to step 342. K/C/M color data 320 is used to build an L* reference table at 322. Using the L* goal table, an L* linearization table is created at 324, one for each printhead die. An output linearization table set is built at 326. At 342, a b* reference table is built, using the Y color data 340. At 344, a b* linearization table is created, one for each printhead die. An output b* linearization table set is created at 346. The output linearization table set for Y color data, and the output linearization table set for K/C/M color data are output at 350, e.g. as an XML document.

FIG. 4B illustrates an exemplary technique for building an L*/b* reference table, steps 322/342 of FIG. 4A. At 322A, a determination is made as to the linearization type. If the mode is the equalization mode, the minimum L*.b* value is determined for each die, and an average minimum L* value is calculated from the maximum L* values, at 322B. In an exemplary embodiment, if consistency checking was enabled at 308, the search for the minimum L* value for each die does not include the first sampled value (255) because consistency checking will make the 255 value the same for all dies. At 322C, the minimum L* data values are sorted. At 322D, a determination is made as to whether the equalization mode is to be based on the minimum drop weight die, the middle drop weight die or the maximum drop weight die. At 322E, an L*/b* goal table is built, using die L*/b* values for the entire curve. If at 322A, the linearization type is the calorimetric mode, then at 322F, either a predetermined L*/b* goal for this media or an average of the L*/b* values for all ten dies is used with the measured paper white value. The L*/b* reference table is built at 322G using the determined minimum L* value and the measured paper (i.e. media) white value.

FIGS. 5A-5E depict data for an exemplary colorimetric mode. FIGS. 6A-6E depict data for an exemplary equalization mode.

Figure 5A:
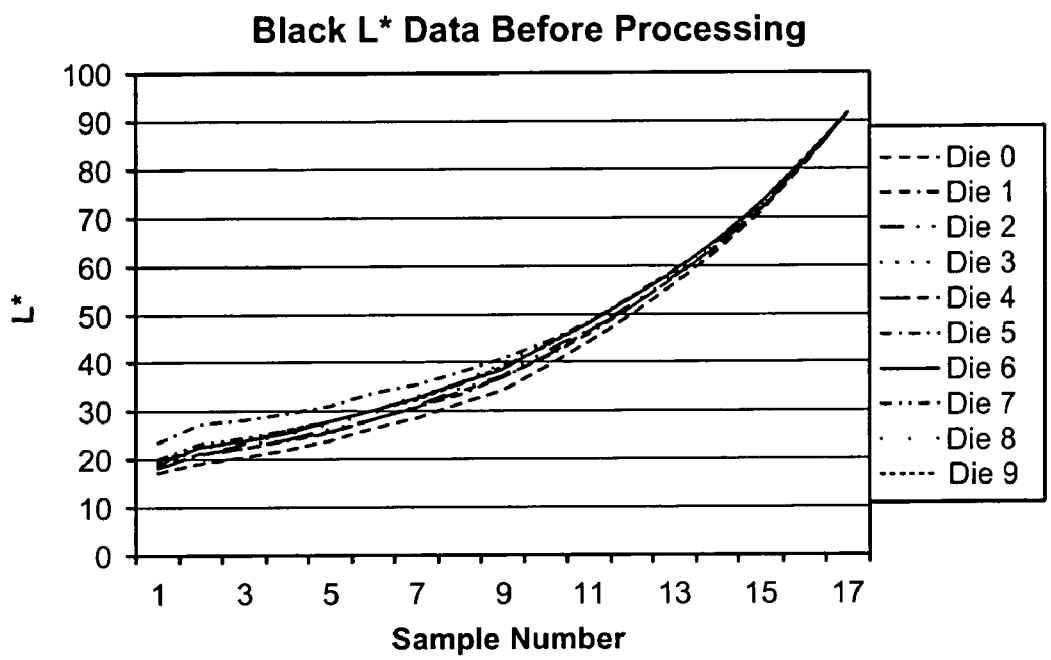
FIGS. 5A-5E are graphical depictions of exemplary black ink tables, for an exemplary colorimetric mode example.
Figure 5B:
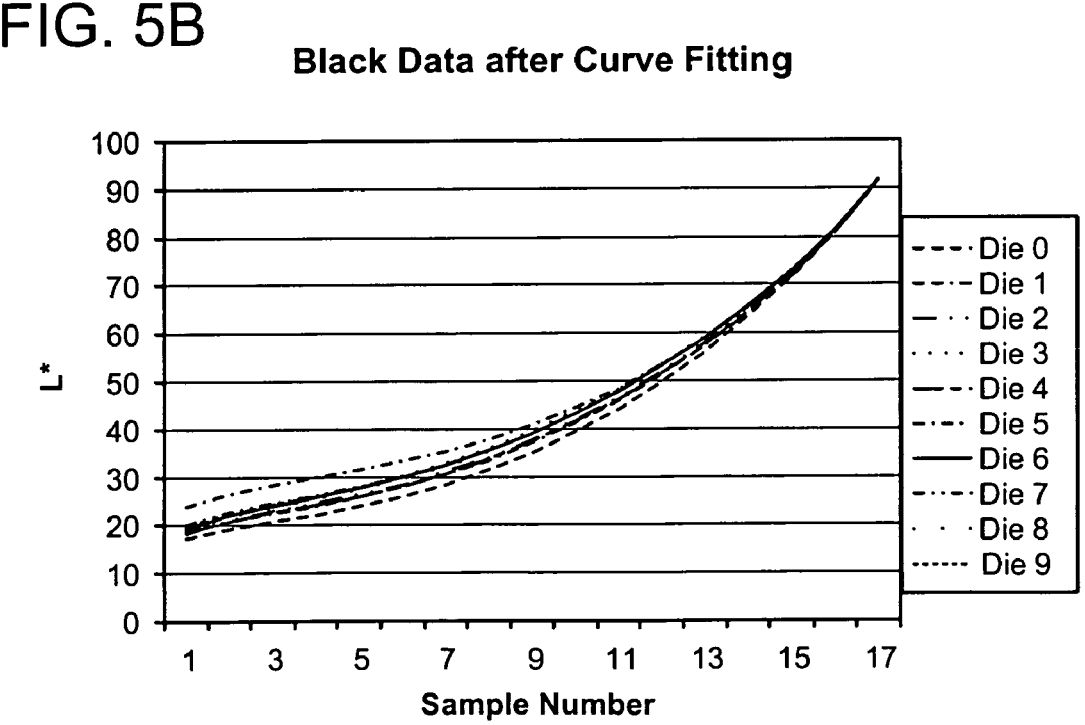
Figure 5C:
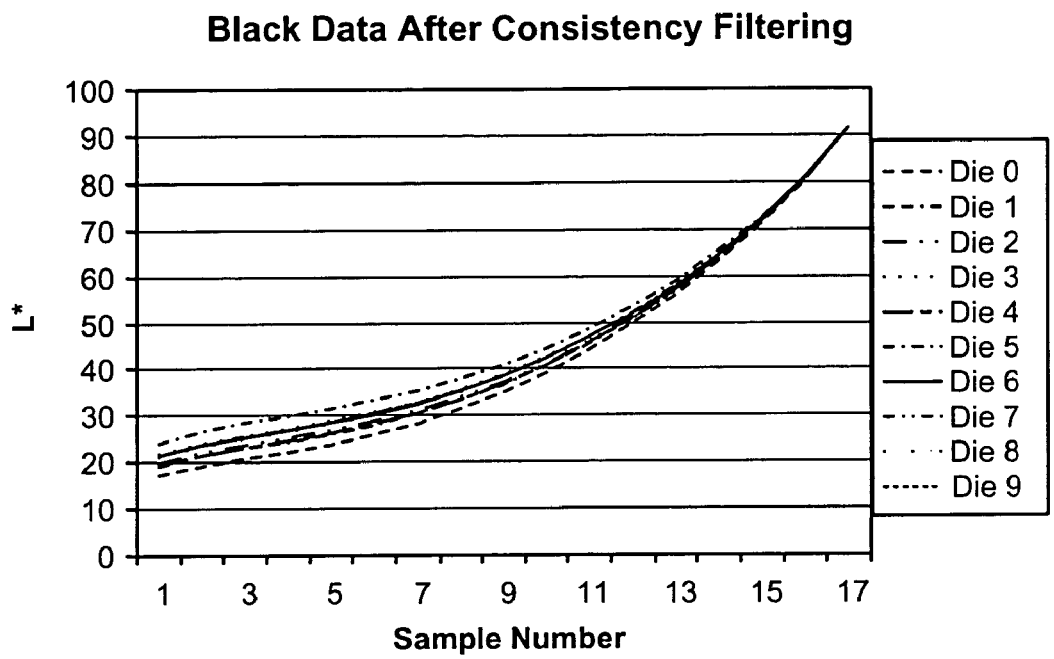
Figure 5D:
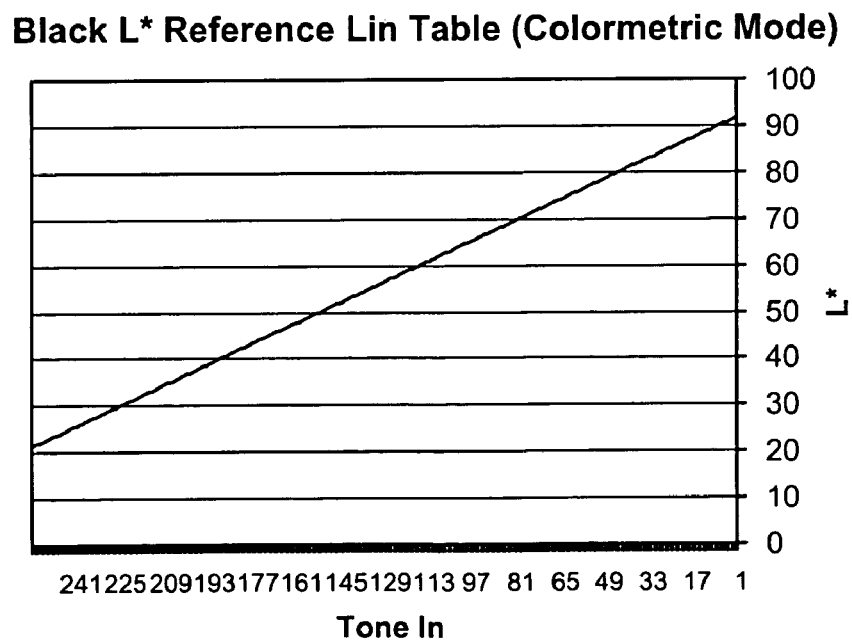
Figure 5E:
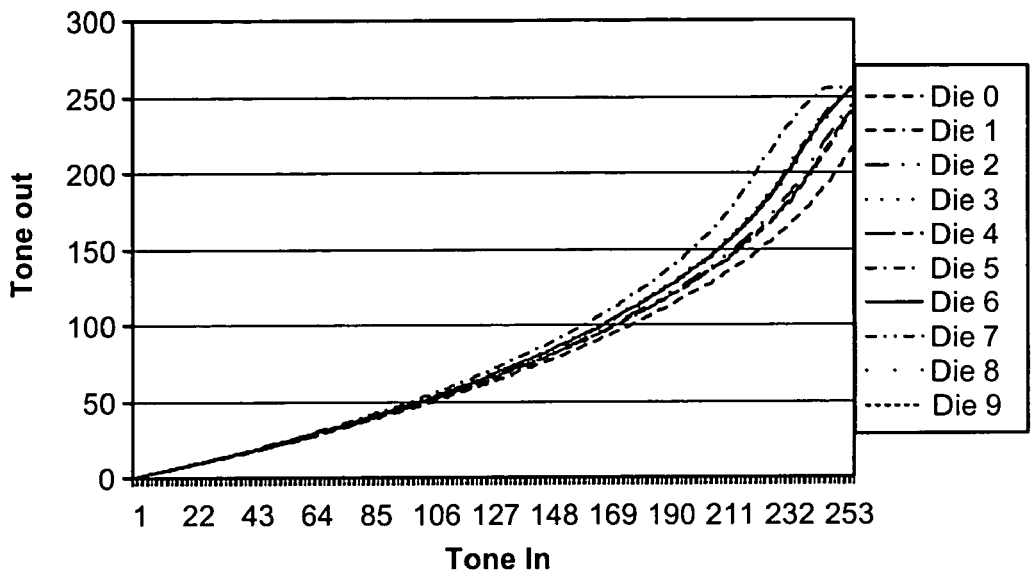

FIGS. 5A-5E are graphical depictions of exemplary black ink tables, for an exemplary colorimetric mode example. FIG. 5A depicts an exemplary set of the black L* data measured from the color targets, for each of the ten dies (die 0 to die 9), before processing. FIG. 5B depicts the data after curve fitting (step 306). FIG. 5C depicts the black data after consistency filtering (step 310). FIG. 5D depicts an exemplary black L* reference linearization table (step 322G). FIG. 5E depicts an exemplary set of output black die linearization tables (step 346).

Figure 6A:
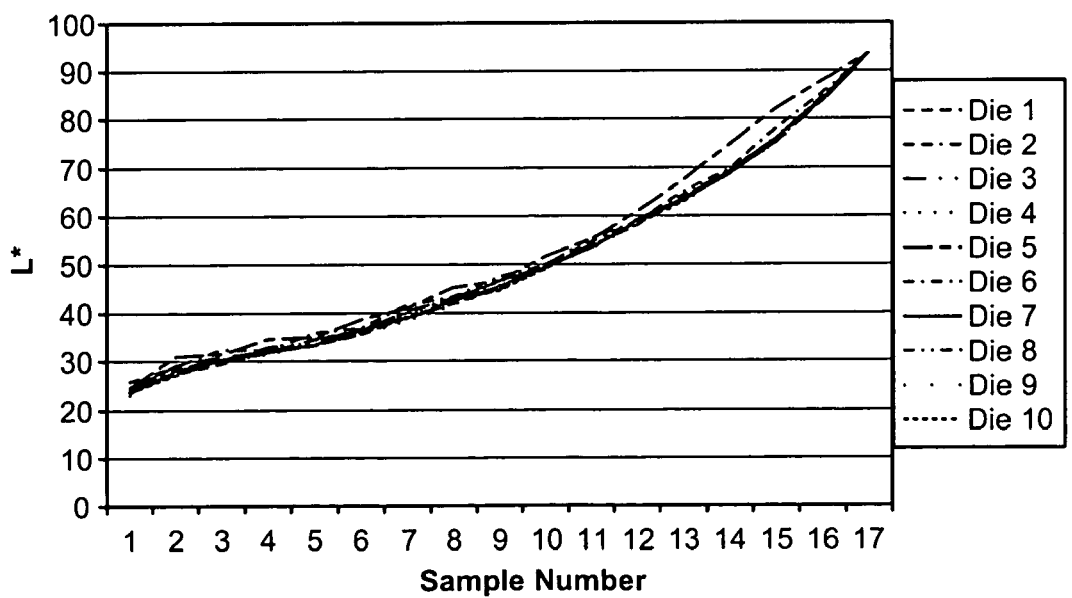
FIGS. 6A-6E are graphical depictions of exemplary black ink tables, for an exemplary equalization mode example.
Figure 6B:
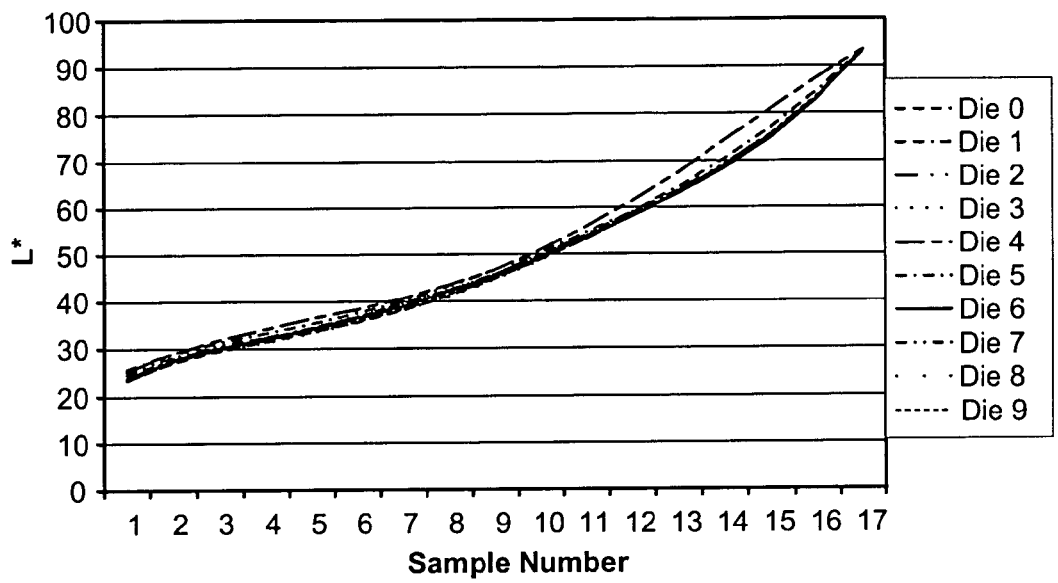
Figure 6C:
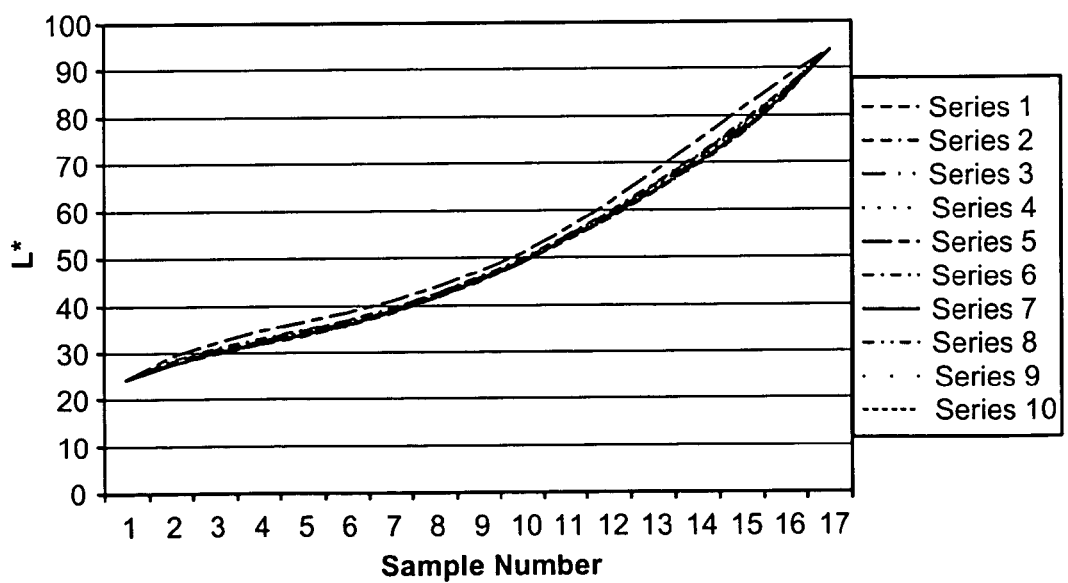
Figure 6D:
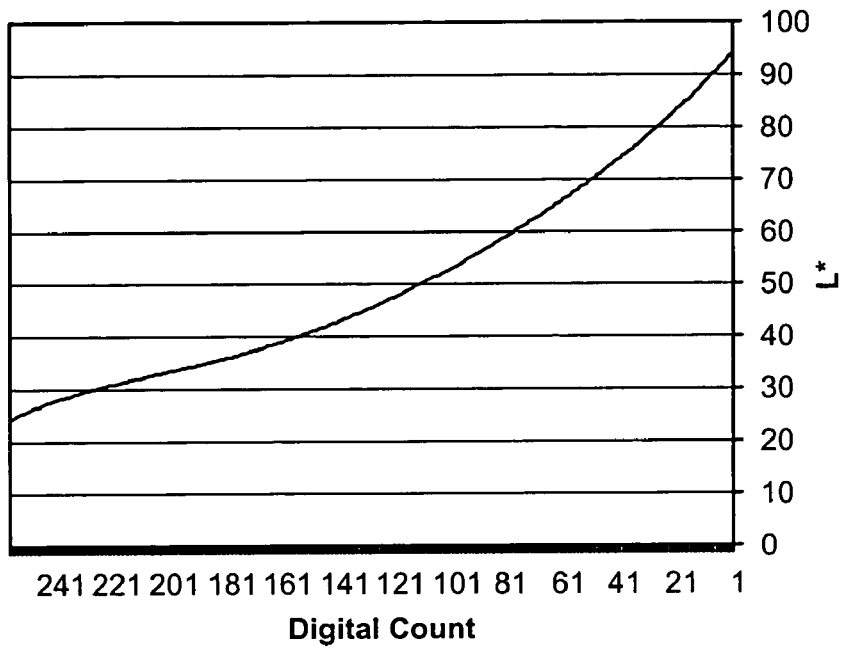
Figure 6E:
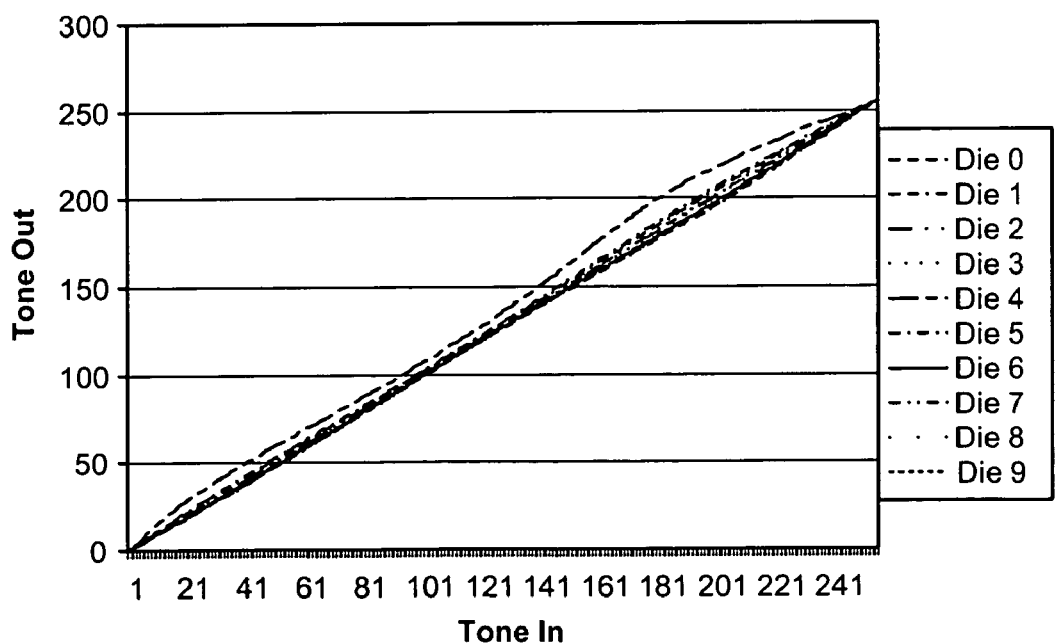

FIGS. 6A-6E are graphical depictions of exemplary black ink tables, for an exemplary equalization mode example. FIG. 6A depicts an exemplary set of the black L* data measured from the color targets, for each of the ten dies (die 0 to die 9), before processing. FIG. 6B depicts the data after curve fitting (step 306). FIG. 6C depicts the black data after consistency filtering (step 310). FIG. 6D depicts an exemplary black L* reference linearization table (step 322E). FIG. 5E depicts an exemplary set of output black die linearization tables (step 326).

Although the foregoing has been a description and illustration of specific embodiments of the invention, various modifications and changes thereto can be made by persons skilled in the art without departing from the scope and spirit of the invention as defined by the following claims.

What is claimed is:

1. A method for calibrating a multiple die printer, comprising:
receiving, for each die of multiple dies, optical density related measurements from a set of calibration targets printed on print media, each calibration target printed by nozzles of a single one of said multiple dies, the targets of each set of varying nominal optical densities:
determining if a media type of the print media is known or unknown;
in response to determining that the media type is unknown,
creating an optical density-related reference linearization table for a selected reference die of said multiple dies based on optical density related measurements of a set of said calibration targets produced by said reference die;
using said optical density related measurements and said reference linearization table, creating linearization tables for each of said multiple dies other than said reference die to match said reference linearization table.

2. The method of claim 1 wherein said multiple dies are arranged to form a page wide print array, and wherein a subset of nozzles of each die do not overlap print areas of the print media of a corresponding subset of nozzles for a same ink color of adjacent dies during printing.

3. The method of claim 1, further comprising: estimating drop weights for each die.

4. The method of claim 1, further comprising: concatenating the linearization tables with previously generated linearization tables for each respective die.

5. The method of claim 1, wherein said optical density related measurements include measurements of L* in the L*a*b* color space.

6. The method of claim 1, wherein said optical density related measurements include measurements of b* in the L*a*b* color space.

7. A method for calibrating a multiple die printer, comprising:
printing with each die calibration target sets on print media of varying nominal optical densities within a range of optical densities;
optically sensing the calibration target sets to provide optical density related measurements of the calibration target sets;
creating an optical density-related reference linearization table for a selected reference die of said multiple dies based on said optical density related measurements of a set of said calibration targets produced by said reference die;
using said optical density measurements and said reference linearization table, creating linearization tables for each of said multiple dies other than said reference die to match said reference linearization table and compensate for drop weight; and creating print mode linearization tables using said reference linearization table for said reference die and said linearization tables for said multiple dies other than said reference die.

8. The method of claim 7, wherein said multiple dies are arranged to form a page wide print array, and wherein a set of nozzles of each die do not overlap print areas of the print media of a corresponding set of nozzles for a same ink color of adjacent dies during printing.

9. The method of claim 7, further comprising: estimating drop weights for each die.

10. The method of claim 7, wherein each die has a first column of nozzles and a second column of nozzles, and a first color of colorant is produced from the first column of nozzles and a second color of colorant is produced from the second column of nozzles, said first color different from said second color.

11. A multiple die printer, comprising:
a controller;
a plurality of printhead dies for ejecting ink onto a print media;
the controller adapted to carry out a calibration algorithm during a calibration mode to create a set of die linearization functions to compensate for drop weight variations among the plurality of printhead dies, the algorithm comprising:
printing with each die calibration target sets on print media of varying nominal optical densities within a range of optical densities;
optically sensing the calibration target sets to provide optical density related measurements of the calibration target sets;
if said print media has an unknown optical characteristic, generating said set of die linearization functions by selecting one of the dies as a reference die, and adjusting the die linearization functions to match measurements of the calibration target sets printed by the reference die.

12. The printer of claim 11, wherein said controller algorithm further comprises: if said print media has a known optical characteristic value, generate said set of die linearization functions by generating a set of linearization tables to linearize the respective die outputs from a goal value to the known optical characteristic value.

13. The printer of claim 11, wherein said known optical characteristic value is a print media whiteness value.

14. The printer of claim 11, wherein said die linearization functions include a set of die linearization tables.

15. The printer of claim 11, wherein said optical density related measurements include measurements of L* in the L*a*b* color space.

16. The printer of claim 11, wherein said optical density related measurements include measurements of b* in the L*a*b* color space.

17. The printer of claim 11, wherein said plurality of printhead dies are arranged to form a page wide print array, and wherein a set of nozzles of each die do not overlap print areas of the print media of a corresponding set of nozzles for a same ink color of adjacent dies during printing.

18. The printer of claim 17, wherein each printhead die has a first column of nozzles and a second column of nozzles, and a first color of colorant is produced from the first column of nozzles and a second color of colorant is produced from the second column of nozzles, said second color different from said second color.

* * * * *

UNITED STATES PATENT AND TRADEMARK OFFICE
CERTIFICATE OF CORRECTION

PATENT NO. : 7,571,974 B2  Page 1 of 1
APPLICATION NO. : 11/191558
DATED : August 11, 2009
INVENTOR(S) : Philip B. Cowan et al.

It is certified that error appears in the above-identified patent and that said Letters Patent is hereby corrected as shown below:

In column 9, line 67, in Claim 7, delete "weight;" and insert -- weight variations; --, therefor.

Signed and Sealed this

Thirty-first Day of August, 2010

David J. Kappos
*Director of the United States Patent and Trademark Office*